United States Patent [19]

Davison

[11] Patent Number: 5,433,277

[45] Date of Patent: Jul. 18, 1995

[54] SOIL IMPLEMENT

[76] Inventor: Geoffrey W. Davison, 15 High Street, Cottenham Cambridge CB4 4RX, England

[21] Appl. No.: 199,259
[22] PCT Filed: Sep. 2, 1992
[86] PCT No.: PCT/GB92/01603
  § 371 Date: Mar. 3, 1994
  § 102(e) Date: Mar. 3, 1994
[87] PCT Pub. No.: WO93/05242
  PCT Pub. Date: Mar. 18, 1993

[30] Foreign Application Priority Data

Sep. 3, 1991 [GB] United Kingdom ............... 9118848

[51] Int. Cl.⁶ .............................................. A01B 35/00
[52] U.S. Cl. ....................................... 172/40; 111/200; 405/182
[58] Field of Search ............... 37/366, 367, 370, 380; 172/474, 448, 698, 40, 694, 720, 724; 405/174, 178, 180, 182

[56] References Cited

U.S. PATENT DOCUMENTS

| | | | |
|---|---|---|---|
| 2,704,499 | 3/1955 | Radway | 172/720 |
| 3,670,512 | 6/1972 | Grazier et al. | 172/40 X |
| 3,726,099 | 4/1973 | Ruge | 61/72.6 |
| 3,908,292 | 9/1975 | Harris | 172/100 X |
| 3,926,004 | 12/1975 | Baylor | 172/40 X |
| 4,079,593 | 3/1978 | Flippin | 37/370 X |
| 4,355,475 | 10/1982 | Harkness | 37/366 X |
| 4,832,531 | 5/1989 | Pavlovits | 405/176 |
| 4,867,606 | 9/1989 | Wright | 172/40 X |
| 4,867,607 | 9/1989 | Johnson et al. | 172/40 X |
| 5,303,663 | 4/1994 | Salestrom | 172/40 X |

Primary Examiner—Dennis L. Taylor
Assistant Examiner—Robert Pezzuto
Attorney, Agent, or Firm—Lee, Mann, Smith, McWilliams, Sweeney & Ohlson

[57] ABSTRACT

A slitting or tenching tool is described comprising a blade adapted to be lowered vertically into the soil and pulled therethrough so as to define a slit or trench having a depth determined by the mean depth to which the blade penetrates the soil, in which a vibrator causes the blade to vibrate at least in a generally up and down manner at the same time as it is moved in a forward direction. A second blade may be provided which is oscillated in a backwards and forwards manner. The second blade includes wings at its lower end to form a horizontal slit which communicates with the vertical trench or slit formed by the first blade. The second blade may be hollow so that finely divided particulate material maybe dispensed therethrough into the trench for backfilling. A pipe or cable dispensing leg may be associated with the blades or situated between them. A tape may be fed into the horizontal slit formed by the second blade. Backfilling may be performed both above and below the horizontal slit which contains the tape. Methods of subsoiling cable and pipe laying with and without marking tape are described.

20 Claims, 3 Drawing Sheets

SOIL IMPLEMENT

FIELD OF THE INVENTION

This invention concerns implements for use in the soil typically for trenching, slitting, mole ploughing, cable laying and subsoil cultivation although the apparatus to be described is not limited to these particular applications.

BACKGROUND OF THE INVENTION

It is known to penetrate the soil using a blade extending downwardly from a carriage which may be self propelled or trailed behind a tractor or similar vehicle. By arranging for the blade to penetrate the soil to a given depth so a slit or trench the width of which is determined by the thickness of the blade can be formed and it is known to backfill the trench with sand or gravel for drainage purposes or to discharge a cable or pipe at a low level in the trench with or without back filling to perform so-called trenchless cable or pipe laying.

It is an object of the present invention to provide an improved slitting or trenching tool and method.

It is another object of the invention to provide an implement which includes an improved slitting or trenching tool and further provides for back filling a slit or trench formed by the tool, and method of performing same.

It is another object of the invention to provide an improved pipe or cable laying apparatus utilising an improved slitting or trenching tool, and method therefor.

It is a further object of the invention to provide a subsoil cultivator which operates in conjunction with an improved slitting or trenching tool.

SUMMARY OF THE INVENTION

According to one aspect of the present invention an improved slitting or trenching tool comprises a blade adapted to be lowered vertically into the soil and pulled therethrough so as to define a slit or trench having a depth determined by the mean depth to which the tool penetrates the soil, characterised by vibrator means adapted to cause the tool to vibrate at least in a generally up and down vertical manner at the same time as the tool is pulled in a forward direction to form the trench or slit.

The amplitude of the vibration is typically small as compared with the mean depth of penetration.

The tool may be directly or indirectly attached to a vibrator drive unit and the latter may be mounted on or suspended from a carriage or frame by means of one or more shock absorbers to reduce the transmission of vibration to the carriage or frame. Where the tool is mounted on a carriage, the latter may be self propelled or adapted to be trailed by a powered vehicle and where the tool is attached to a frame, the latter may be adapted to be attached to a three point linkage on the rear of a tractor or similar land vehicle or adapted to be mounted on the rear of a carriage which itself may be self propelled or adapted to be trailed.

According to a preferred aspect of the invention, a second tool is provided, which is adapted to be lowered into the soil either with or after the vibrating tool has penetrated to its working depth, the second tool being adapted to enter the trench or slit formed by the first tool and to follow the latter in the direction of its forward movement, characterised in that the second tool is also caused to vibrate that in a direction generally perpendicular to the direction of vibration of the first tool.

Whilst the first tool can therefore be thought of as vibrating in a generally vertical manner, the second tool can be thought of as vibrating in a generally horizontal manner.

Typically the second tool is caused to vibrate in a direction generally parallel to the forward direction of movement of the said first tool.

Although horizontal and vertical have been used to describe the general directions of oscillation of the tools, it is to be understood that the terms are intended to be descriptive not definitive. In particular the horizontal motion of the following second tool may be achieved by mounting the second tool at the lower end of a relatively long arm, the upper end of which is pivotally joined to the carriage or frame carrying the first tool and the generally horizontal oscillation of the second tool may be achieved by a form of reciprocal motion causing the relatively long arm to oscillate about the upper pivot axis. Provided the tool is relatively distant from the pivot axis and the amplitude of the motion is relatively small, the arc through which the tool is swung during each oscillation will approximate to a straight line and provided the tool is suspended generally vertically in the first place, the motion can be thought of as being generally horizontal.

Separate vibrator drive means may be provided for each of the two tools.

Alternatively and preferably a single vibrator drive is provided and a direction changing transmission coupling is provided between the vibrator drive and at least one of the tools so that the direction of vibration is translated through approximately 90° so that whereas vibration transmitted to the first tool causes the latter to vibrate in a generally vertical manner, the vibration transmitted to the second following tool will cause the latter to move in a generally horizontal manner.

The vibrator drive means may be powered by an internal combustion engine driven for example by petrol or diesel, or may be pneumatically or hydraulically powered or may be electrically powered as from a storage battery or altenator driven by an internal combustion engine, which may not be on the carriage on which the implement is mounted. Alternatively a rotary to vibratory drive converter may be provided to enable rotational drive from a PTO shaft on a tractor or the like vehicle to be used as the power source for producing the vibration.

A convenient direction changing device comprises an L-shaped rocker arm pivotally mounted at its vertex with the generally horizontally protruding arm engaging the drive for the vertically oscillating front tool and a connecting arm is pivotally joined to the upper end of the vertical element of the L-shaped rocker to communicate the arcuate movement of the long arm pivotally mounted at its upper end and carrying the second tool at its lower end. It will be seen that vertical oscillation of the outboard end of the horizontal arm of the rocker will appear as generally horizontal oscillation of the upper end of the vertical arm thereof.

In one embodiment of the invention, the second tool includes a generally horizontal, plate-like enlargement at its lower end, for digging and forming a shallow horizontal slit.

Typically the plate is in the form of a pair of wings which extend laterally and rearwardly from the opposite sides of the tool but are angled sufficiently relative to the horizontal to cause the latter to enter the soil in the same way as a mole plough and with forward traction dig lower and lower into the soil until a desired depth is achieved as determined in known manner by depth controlling means. Forward and backward oscillation of the second tool greatly assists the penetration of the digging plate at its lower end.

The two tools may be lowered towards the soil as a pair with the vertically oscillating forward tool extending just below the lower end of the second plate carrying tool so that the soil is broken up and a trench is begun to be formed before the second tool attempts to penetrate the soil.

A machine constructed as aforesaid serves as a sub-surface cultivator and very effectively breaks up and cultivates the soil at a constant depth below the level of the ground with minimal surface disturbance, and the only evidence of the subsoiling activity being a narrow slit typically of the order of one inch wide, which if desired can be backfilled with sand or gravel or soil.

In another embodiment of the invention, the second tool includes a small hopper located thereon at a point which will normally be above the ground level, the hopper feeding a hollow blade, at least a part of the trailing edge of which is open to permit the discharge of finely divided particulate material contained within the hopper into the slit or trench formed by the first tool. Vibration of the hopper and associated mounting facilitates the feed of the finely divided material from the slit into the trench and the back filling of the particulate material caused by the backward kicking action of the hopper exit blade during each half-cycle of the vibration.

In another embodiment of the invention the first tool or leading element again comprises a cutting blade which is vibrated in a generally vertical plane and the trailing element is provided with a hollow winged duct through which a tape or other flat member can be dispensed from a reel located above the implement. This arrangement is of particular application in a pipe or cable laying apparatus where a hollow duct feeds a flexible pipe or cable to a position near the bottom of the slit or trench formed by the first tool, the feeding duct being located immediately behind the first tool and immediately in front of the second tool which provides the exit for the tape. The depth of penetration of the second tool dispensing the tape is selected so that the tape is located at a constant height above the level at which the pipe or cable is laid in the slit and provides a warning to a person digging or excavating subsequently that a pipe or cable lies immediately below the tape.

The cable or tube feeding duct may be attached to or form part of the first tool or the second tool or be entirely separate from both.

This particular aspect of the invention is of particular advantage since hitherto the laying of warning tape above cable or pipe laid using a trenchless technique (ie in which the cable or pipe is fed into a slit formed by a slitting tool which is dragged through the soil immediately ahead of the pipe or cable feed, and in which the slit is back filled above the pipe or cable immediately thereafter) has been virtually impossible, since to be of use the tape should be wider than the diameter of the pipe or cable which it protects, and therefore the width of the slot into which the pipe or cable is fed is a trenchless method.

Attempts to dispense tape by fixing the tape dispenser to the vertically oscillating leg cutting the slit has introduced too much strain on the machine, has required excessive power and has tended to disrupt the surface. By using a horizontal forward and backward oscillatory motion, the tape dispensing leg enters the soil readily and easily, follows the slit forming leg without difficulty and produces a narrow horizontal slit into which the tape can be fed with little or no surface disruption.

The use of a hopper with rearwardly open hollow feed blade attached to or operating in combination with the second tool may be incorporated into either the sub-soil cultivator or the improved cable pipe laying apparatus for the purpose of back filling the trench and where the tape is to be separated from the cable or pipe, a first backfill feed may be located between the pipe or cable dispensing duct and the second tool dispensing the tape and a second backfill feed may follow the second tool so that sand or gravel or soil or any mixture thereof may be dispensed both above and below the tape as the latter is fed into the slit.

Apparatus constructed in accordance with the invention may be to advantage located at one end of a carriage on which an internal combustion engine and other drive means is mounted and a conventional chain trencher arm may be located at the other end of the apparatus, the vibrating tool slitter being capable of being elevated as by pivotting well clear of the soil at one end of the machine and the chain trenching arm also being capable of being elevated well clear of the ground as by pivotting of the other end of the machine, and clutch or other drive connection means may be provided for transmitting drive to one or the other of the two implements, so that a general purpose trenching and slitting machine is provided. The carriage may be self-propelled by transmitting drive from the internal combustion engine to the wheels, which may be tracked, or a winch may be provided for incrementally advancing the machine by winding up a cable onto a drum, the other end of the cable being anchored to a steady or fixed point towards which the vehicle is to travel as the cable is wound in.

The invention also lies in a method of forming a slit and simultaneous subsoil cultivating comprising the steps of vertically vibrating a first slit forming tool and horizontally vibrating a second tool which follows the first tool in a generally horizontal plane, a subsoiling device being attached to the second tool.

The invention also lies in a method of sub-soil dispensing a protective tape comprising the steps of forming a slit by means of a generally vertically vibrating first tool and dispensing tape through a second tool the lower end of which terminates in a shallow exit duct and the tape is fed in a folded or rolled up condition down the second tool and by means of guide means is unfolded or unravelled before passing through the shallow exit duct which extends in a generally horizontal manner and includes a rear opening through which the unfolded or unravelled tape can pass in a generally flat condition, and wherein the second tool is caused to vibrate forwardly and backwardly in a generally horizontal plane to facilitate in the formation of the narrow slit into which the tape can be dispensed.

The aforementioned method may also include the step of dispensing pipe or cable in advance of the dispensing of the tape and at a lower level so that the tape overlies the cable or pipe by a given depth.

The method may also include the steps of backfilling the slit at least after the tape is dispensed.

The invention also lies in a method of backfilling a slit formed by a first tool which is caused to vibrate in a generally vertical manner by feeding finely divided particulate material into the slit from a hopper above around level through a slit-like tool adapted to follow the first tool in the slit formed thereby, and to distribute finely divided particulate material into the slit wherein at least the dispensing blade if not the blade and hopper are caused to vibrate in a generally horizontal plane parallel to the direction of forward movement to facilitate the feeding of the particulate material into the slit and to assist in back filling due to the continual reverse kicking of the dispensing blade against the particulate material building up in the slit.

The invention will now be described, by way of example, with reference to the accompanying drawings, in which.

Figure 1:
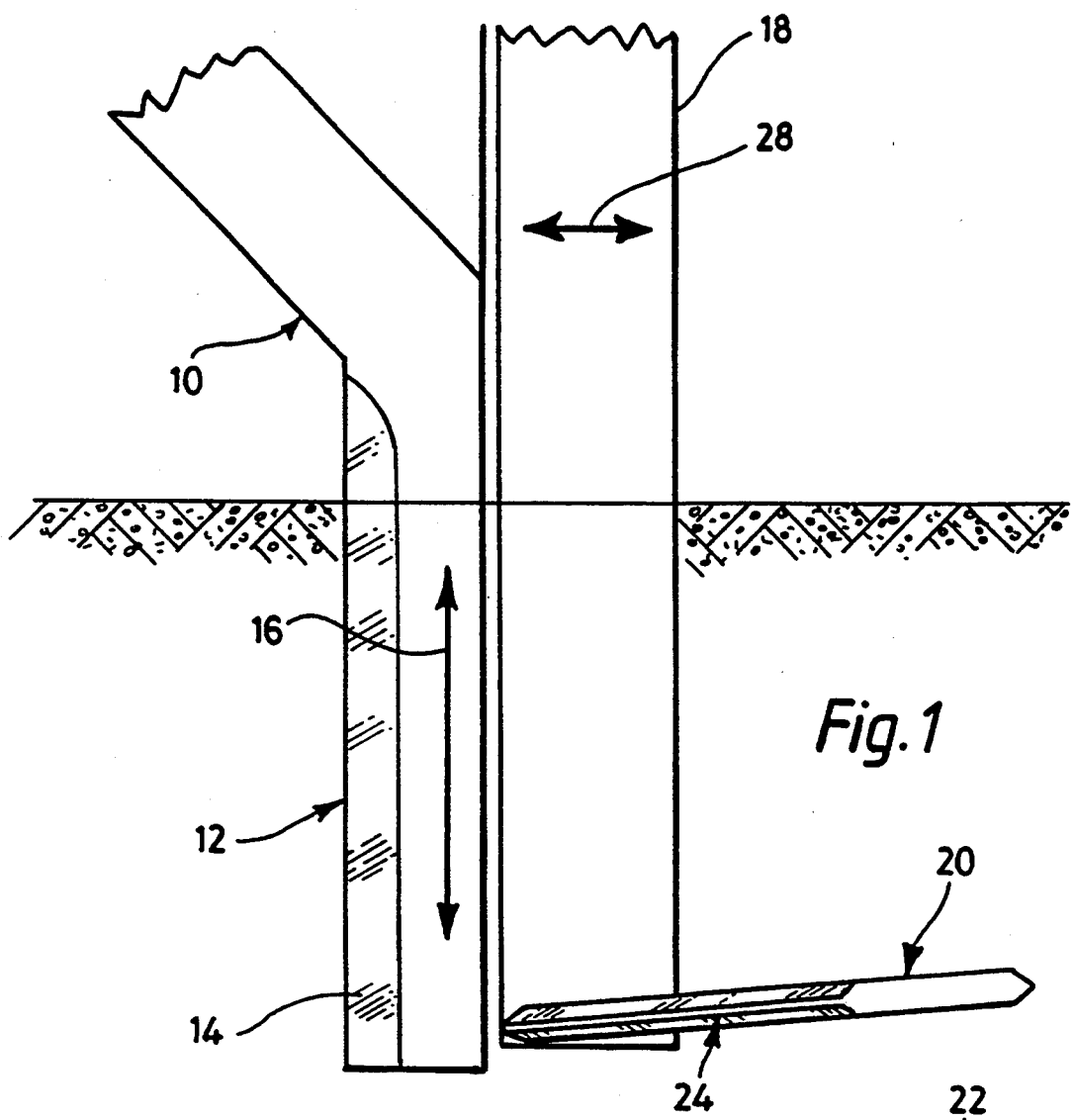
FIG. 1 illustrates a subsoil cultivator.

In FIG. 1 a slitting tool generally designated 10 has a vertical cutting edge 12 one or both edges of which are chainfeted as at 14 and the upper end of the tool 10 is attached to or driven by a vibrator unit (not shown) to produce a generally vertical up and down oscillation of the generally vertical lower section of the tool as denoted by the arrow 16.

Figure 2:
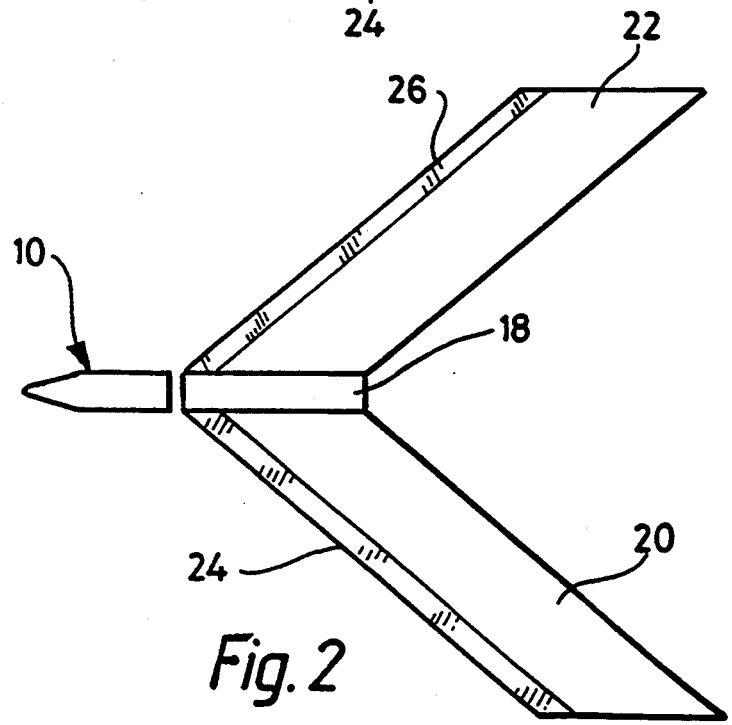
FIG. 2 is a plan view from below of the apparatus shown in FIG. 1.

Immediately to the rear of the slitter 10 is located a second tool 18 in the form of a thin blade from the lower end of which extend two diverging wings 20 and 22 as best seen in FIG. 2. The formed edges of the wing are chamfered to form cutting edges as denoted by 24 and 26 respectively and as best seen in FIG. 1, the two wings are angled so that when the blade 18 is generally vertical, the forward cutting edges 24 and 26 of the blade are in fact a little lower than the trailing edges so as to assist in penetration with forward movement.

Using a second vibrator unit or by modifying the drive from the first vibrator unit, the blade 18 is forced to oscillate in a generally horizontal plane to produce a front to back movement as denoted by arrow 28.

In operation the two tools 10 and 18 are lowered towards the ground with both tools driven in vibration. As the first tool 10 engages the soil, a shallow furrow is formed with increasing depth as the tool is lowered and the lower edge of the blade 18 enters the furrow or slit formed by the blade 10. The wings 24 and 26 attack the surface of the soil in the manner of a vibrating spade edge and with continued forward movement of the tools and generally downward penetration, the wings continue to slice into the soil until the tools occupy the depth at which continued slitting and subsoil cultivation is desired. Further lowering of the tools is prevented as by a stop and continued forward movement results in a narrow slit being formed across the land with active subsoil cultivation occurring at the depth at which the wings are located. Provided the latter are more than a few inches below the soil, little or no surface disturbance occurs which is or considerable importance in a sports ground or playing field situation.

When subsoil cultivation has been completed, the procedure is reversed, this time the tools being lifted out of the soil with continued forward movement.

Lowering and lifting may be hydraulically controlled as by a hydraulic ram means if desired.

Figure 3:
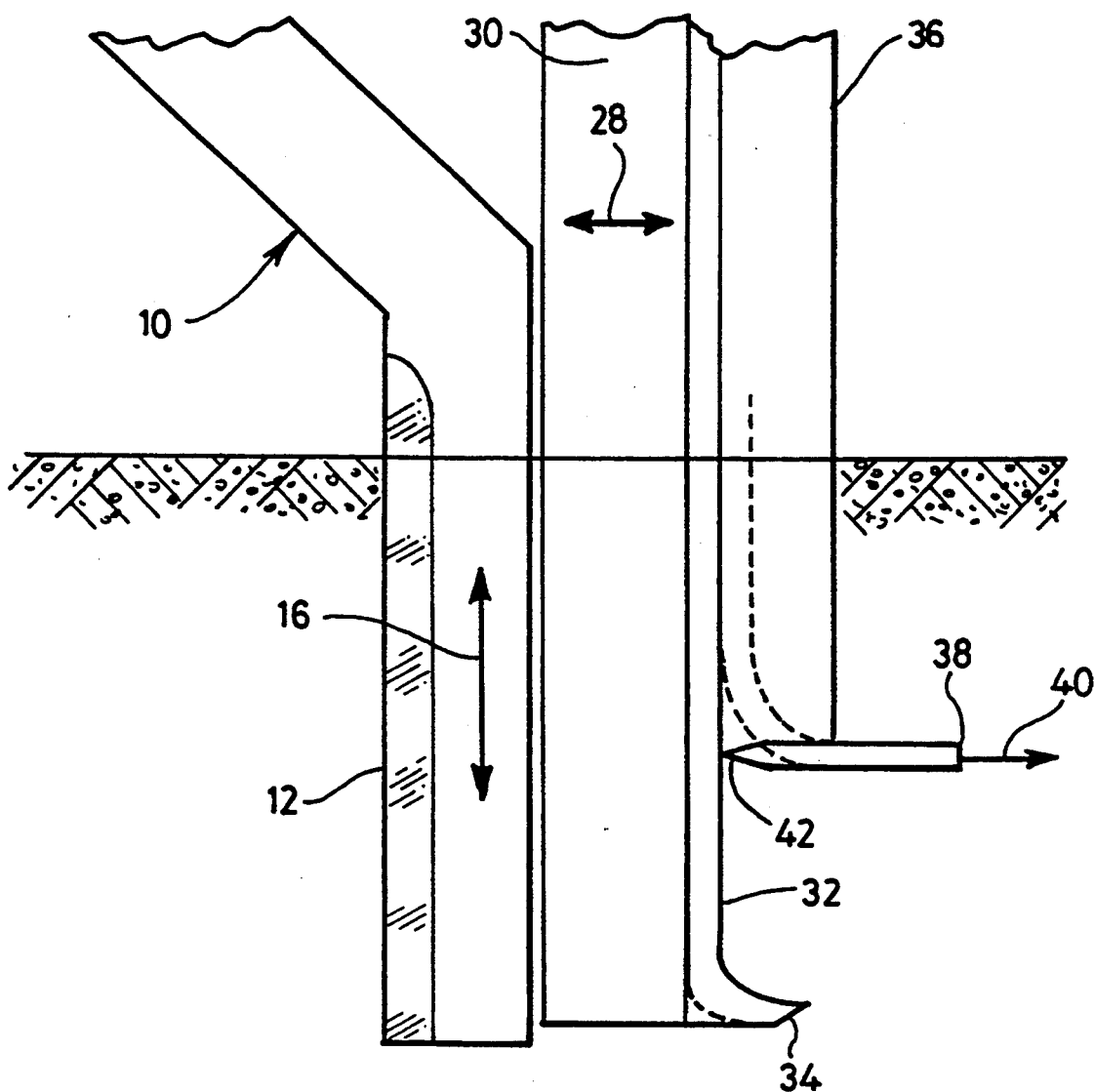
FIG. 3 illustrates a trenchless warning tape placement implement.

In FIG. 3 the forward tool is of similar form and configuration to that shown in FIG. 1 and similar reference numerals are employed as employed in FIGS. 1 and 2.

The following tool also comprises a narrow blade 30 similar to that of 18 in FIG. 1, but instead of having wings attached to the lower end, a pipe or cable duct 32 extends down the rear edge of the tool 30 to convey a pipe or cable to the lower end thereof to exit through the opening 34 at the bottom of the slit formed by the first tool 10.

The blade 30 is driven in vibration as previously described so as to produce oscillation as denoted by reference numeral 28. This facilitates the passage of the tool 30 through the slit and also the exiting of the pipe or cable into the trench.

Advantageously a second blade either attached to or similarly vibrated and denoted by reference numeral 36 is located to the rear of the blade 30 and provides a feed for a warning tape which is fed down the hollow interior of the blade 36 to its lower end where guide means causes the tape to become unfolded and pass out through a horizontal slit in a flared outlet 38 in the direction of the arrow 40.

A cutting edge 42 is formed on the leading edges of the tape outlet.

Figure 4:
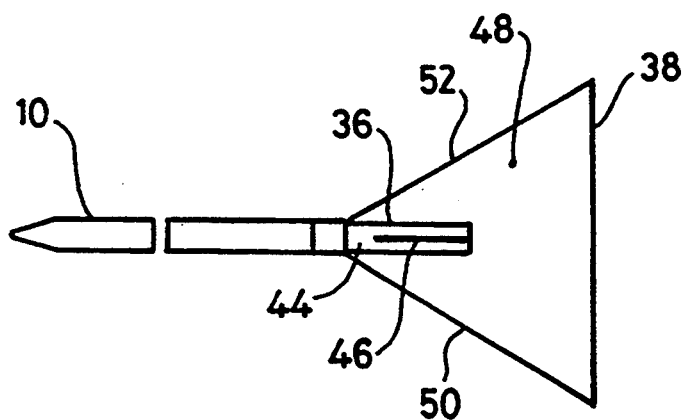
FIG. 4 is a view from above of the apparatus shown in FIG. 3.

A plan view from above shown in FIG. 4 illustrates the hollow vertical duct 44 in the blade 36 and the central vertical guide 46 at the lower end which forces the folded tape which is fed down the duct 36 with the two abutting edges on either side of the central guide 46, to thereby cause the tape to splay outwards into the generally flat triangular shaped dispensing nozzle 48 and to pass out through the narrow slit at the rear edge thereof denoted by 38. As mentioned in the description of FIG. 3, the two leading edges 50 and 52 of the dispensing device 48 may be chamfered to form cutting edges as denoted by 42.

In accordance with the invention the backwards and forwards oscillation of the blade 36 and more particularly the generally flat outlet nozzle 48 results in a clean and relatively easy slitting action at right angles to the main slit formed by the tool 10 so that the tape can be dispensed in generally flat manner into the slit so formed.

Figure 5:
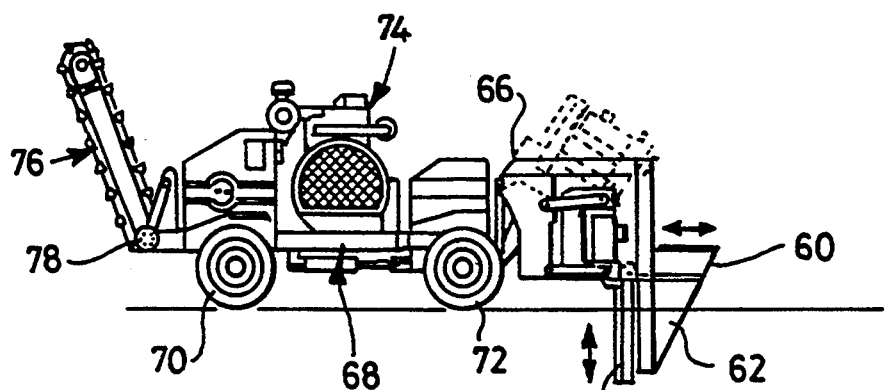
FIG. 5 illustrates a composite machine for trenching or slitting.
Figure 5A:
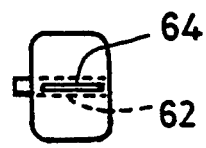

FIG. 5 illustrates a further arrangement in which the second tool carries a hopper 60 above ground level, the hopper feeding a blade feed 62 at least a part of the rear edge of which is open to permit particulate material to feed therethrough into the slit. A plan view of the hopper is shown in FIG. 5a in which the entrance to the hollow blade can be seen at 64.

The latter is preceded in accordance with the invention by a slitting tool which is vibrated and adjusted in a vertical manner and the tool conveniently comprises the tool shown at 10 in FIG. 1. Reference is made to FIG. 1 and the description relating thereto for detail thereof.

The tool combination is shown mounted on a framework generally designated 66 which is pivotally mounted at one end on a trolley generally designated 68 having four wheels, two of which are shown at 70 and 72 and carrying a power unit such as an internal combustion engine 74. In the example shown, the trolley 68 also supports a chain trenching arm 76 which can also be elevated by pivotting about 78. Drive for the chain or the slitter assembly at the other end can be selected by means of a clutch or other drive transmission device (not shown) to enable the one or the other to be powered by the power unit 74.

The carriage may be trailed behind a tractor or other land vehicle or drive may be transmitted to one or other of the pairs of wheels or to a winch for winching inboard a cable stretched between the trolley and a fixed anchoring point.

Figure 6:
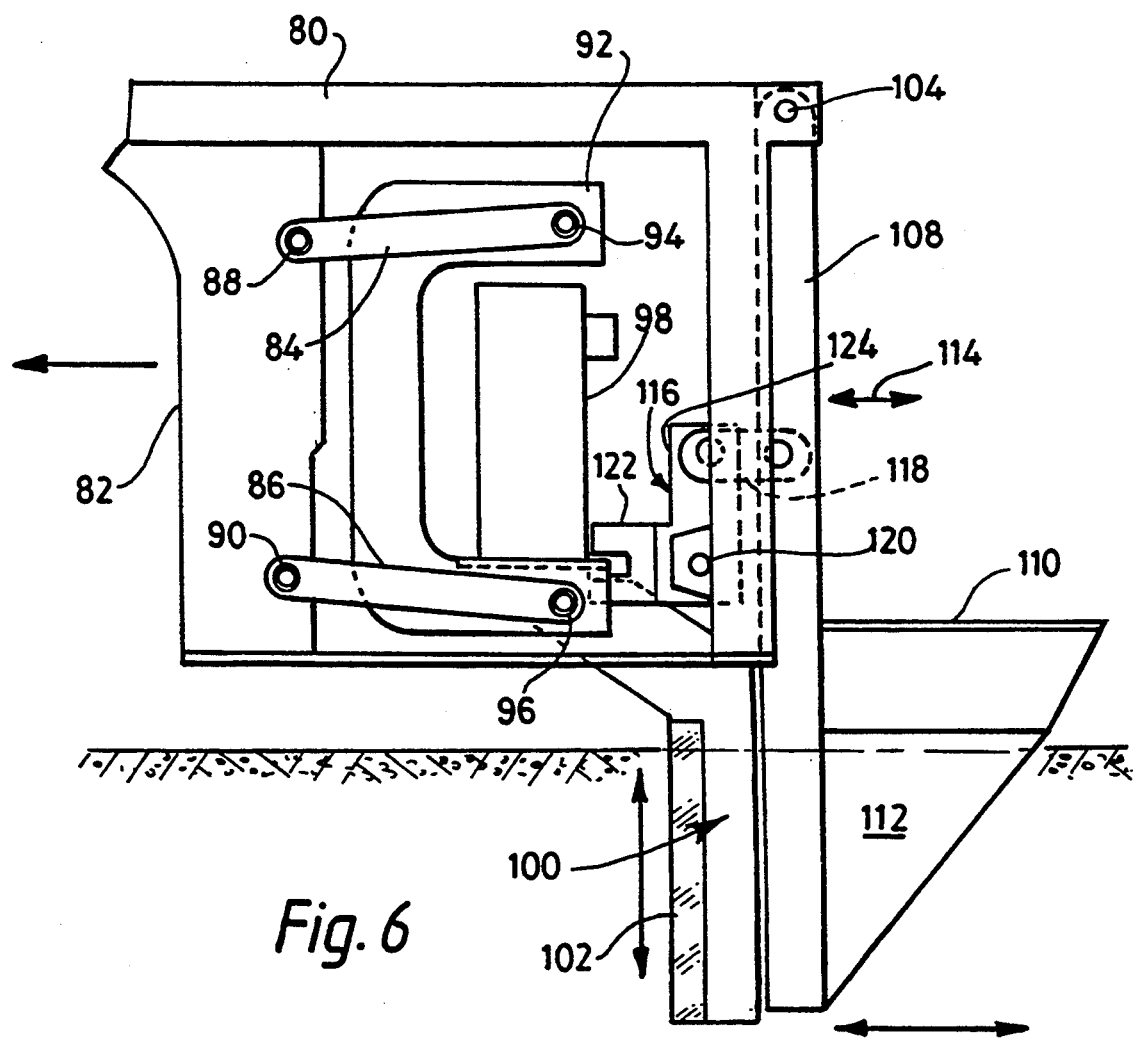
FIG. 6 illustrates the mounting of a vibrator drive in the apparatus shown in FIG. 5.

FIG. 6 shows in greater detail the vibrator drive and the mechanism by which vibration can be transmitted at right angles to the second tool.

Part of the rigid frame is denoted by reference numeral 80 and a vertical member thereof 82 has two shock absorbing arms 84 and 86 pivotally attached at 88 and 90 thereto. A C-shaped housing 92 is pivotally attached to the outboard end of the shock absorber arms 84 and 86 at 94 and 96 respectively and a vibrator drive unit 98 is mounted within the C-shaped frame 92.

Attached to the lower arm of the frame 92 is the upper end of the slitting tool 100 the leading edge of which is chamfered on both sides to provide a cutting edge as at 102. Vibration from the vibrator drive 98 causes the C-shaped housing 92 likewise to vibrate in and up and down manner and likewise the tool 100 attached thereto.

The second tool is pivotally attached at 104 to an overhanging section of the rigid frame 80 so as to hang in a generally vertical manner to the rear of the tool 100. The second tool is denoted by reference numeral 108 and comprises a similar narrow blade-like member having the same thickness or slightly less thickness than that of the blade of the cutting tool 100 so that it can follow the tool 100 through the slit formed by the cutting tool 100. A hopper 110 is mounted approximately half way down the arm 108 and the latter feeds a hollow blade-like feed 112 the rear edge of which is open to permit the egress of material from the hopper, typically sand, gravel or earth.

The second tool is caused to vibrate in a generally horizontal manner as denoted by the arrow 114 by means of a crank arm 116 which transmits the up and down vibration of the tool 100 to a connecting link 118 one end of which is pivotally attached to the crank arm and the other end of which is pivotally attached to the arm 108 of the second tool.

The crank arm 116 is itself pivotally attached to the rigid frame at point 120 so that up and down movement of the arm 122 results in front to back movement of the arm 124.

The generally horizontal forward and rearward movement of the arm 108 and hopper 110 facilitates the dispensing of the particulate material within the hopper to the slit and also facilitiates the backfilling of the slit since with every rearward movement of the trailing edge of the blade 112, the particulate material already dispensed into the slit is compacted.

The invention has been shown as applied to a number of different implements for slitting, trenching, cable and pipe laying and subsoil cultivation. It will be appreciated that these functions can be combined so that simultaneously subsoil cultivation can be followed by cable laying or pipe laying, trench filling with sand or gravel and/or protective tape laying. However the invention is not limited to the single operation of any one of these techniques nor the combination of any two or more of such techniques and is likewise not limited to any of the aforementioned techniques but may be applied to any soil penetrating tool adapted for any purpose.

I claim:

1. Slitting or trenching tool comprising a blade adapted to be lowered vertically into the soil and moved therethrough so as to define a slit or trench having a depth determined by the mean depth to which the blade penetrates the soil, first vibrator means adapted to cause the blade to vibrate in a generally up and down manner at the same time as it is moved in a forward direction to form the trench or slit, and a second blade adapted to be lowered into the soil either with or after the first blade has penetrated to its working depth, the second blade occupying the trench or slit formed by the first blade and following the latter in the direction of its forward movement, and second vibrator means for causing the second blade to vibrate in a direction generally perpendicular to the direction of vibration of the first blade.

2. Tool as claimed in claim 1 wherein the amplitude of the vibration is small as compared with one of the length of the blade and the mean depth of penetration.

3. Tool as claimed in claim 1 wherein a vibrator drive unit is mounted on a carriage or frame by means of one or more shock absorbers to reduce the transmission of vibration to the carriage or frame.

4. Tool as claimed in claim 1 further comprising means for feeding a flexible pipe or cable into the slit or trench to the rear of the tool.

5. Tool as claimed in claims 1 further comprising means for feeding a flexible tape or ribbon into the slit or trench to the rear of the tool.

6. Tool as claimed in claim 1 further comprising means for feeding finely divided particulate material into the slit to the rear of the tool, to backfill the slit or trench.

7. Tool as claimed claim 1 in which the second blade is vibrated in a backward and forward sense relative to the direction of movement of the tool through the soil.

8. Tool as claimed in claim 1 wherein a single vibrator drive is provided and a direction changing transmission coupling is provided between the vibrator drive and at least one of the blades so that the direction of vibration is translated through approximately 90° so that whereas vibration transmitted to the first blade causes the latter to vibrate in a generally vertical manner the vibration transmitted to the second blade will cause the latter to move in a generally horizontal manner.

9. Tool as claimed in claim 8 wherein the direction changing device comprises an L-shaped rocking member having generally horizontal and vertical arms connected at a vertex at which the member is pivotally mounted, the horizontal arm driving he first blade and the vertical arm being pivotally jointed to one end of a connecting link which is pivotally joined at the other end to a pivotally mounted long arm having a lower end which carries the second blade, the vertical oscillation of an outboard end of the horizontal arm being translated into a generally horizontal oscillation of an outboard end of the vertical arm.

10. Tool as claimed in claim 1 wherein the second blade includes a plate-like enlargement extending from at least one side of the blade at a lower end thereof, for digging and forming a generally horizontal slit.

11. Tool as claimed in claim 10 wherein the enlargement is in the form of a pair of wings which extend laterally and rearwardly from opposite sides of the blade and are angled relative to the horizontal to cause the latter to enter the soil as a mole plough and with forward traction to dig lower and lower into the soil until a desired depth is achieved as determined in known manner by a depth controlling means.

12. Tool as claimed in claim 1 wherein the two blades are adapted to be lowered towards the soil as a pair with the vertically oscillating forward blade extending just below the lower end of the second blade so that the soil is broken up and a trench is begun to be formed before the second blade begins to penetrate.

13. Tool as claimed in claim 4 wherein the pipe or cable feeding means is a hollow duct.

14. Tool as claimed in claim 13 wherein the hollow duct is attached to part of the first or second blade.

15. Tool as claimed in claim 5 wherein the second blade is provided with a hollow duct through which the tape is dispensed from a reel thereof located thereabove.

16. A method of sub-soiling comprising the step of forcing a tool as claimed in claim 1 through the ground so as to break up and cultivate the soil at a constant depth below the level of the ground with minimal surface disturbance.

17. A method of forming a slit and simultaneously sub-soil cultivating, comprising the steps of vertically vibrating a first slit forming tool and horizontally vibrating a second tool which follows the first tool, a sub-soiling device being attached to the second tool.

18. A method of dispensing and laying a protective tape below soil level comprising the steps of forming a slit by means of a vertically vibrating first tool and dispensing tape through a second tool which follows the first in the slit and the lower end of which terminates in an exit duct, and the tape is fed down the second tool and through the exit duct which extends in a generally horizontal manner and includes a rear opening through which the tape can pass in a generally flat condition and wherein the second tool is caused to vibrate forwardly and backwardly in a generally horizontal plane to facilitate in the formation of the narrow slit into which the tape is to be dispensed.

19. The method of claim 18 further including the step of simultaneously dispensing pipe or cable in advance of a tape and at a lower level so that the tape overlies the cable or pipe in the ground.

20. A method of backfilling a slit in soil comprising the steps of forming the slit by use of a first blade, causing the blade to vibrate in a generally vertical manner, feeding finely divided particulate material into the slit from a hopper through a hollow dispensing blade adapted to follow a first blade in the slit, causing at least the hollow dispensing blade to vibrate in a generally horizontal plane parallel to the direction of forward movement to facilitate the feeding of the particulate material into the slit and to assist in backfilling due to the continual reverse action of the dispensing blade against the particulate material building up in the slit.

* * * * *